United States Patent [19]

Bollinger et al.

[11] 4,408,483
[45] Oct. 11, 1983

[54] ENGINE MONITORING SYSTEM

[75] Inventors: John G. Bollinger, Madison, Wis.; Richard E. Nichols; Dale H. Delaruelle, both of Melbourne, Fla.

[73] Assignee: Harris Corporation, Melbourne, Fla.

[21] Appl. No.: 294,990

[22] Filed: Aug. 21, 1981

[51] Int. Cl.³ .................................. G01M 15/00
[52] U.S. Cl. .............................. 73/115; 73/117.3
[58] Field of Search ............. 73/115, 116, 118, 117.3, 73/35, 119 R; 123/193 CH

[56] References Cited

U.S. PATENT DOCUMENTS

| 3,503,256 | 3/1970 | List et al. | 73/115 |
| 3,659,568 | 5/1972 | Howe | 123/193 CH X |
| 4,036,050 | 7/1977 | Dooley et al. | 73/119 A |

Primary Examiner—Jerry W. Myracle
Attorney, Agent, or Firm—Antonelli, Terry & Wands

[57] ABSTRACT

A system for monitoring the performance of an internal combustion engine includes a pressure sensor that has a mounting configuration external to the cylinders such that it is capable of monitoring the pressures within two adjacent cylinders. The signal output of the sensor is filtered to remove undesired engine noise and blank out those signals which are unrelated to compression and firing, thereby reducing errors in the signal output. After filtering the signals to reduce noise, a successive number of samples related to compression and firing are obtained to provide an adequate number of signals which will average out mechanical and electrical noise. From the successive samples, a straight line approximation of the slope of the cylinder pressure curve, relative to crank angle, is obtained. The derived slope values are compared with upper and lower limits to determine whether or not the pressure within the engine cylinder of interest is acceptable. If the upper limit is exceeded or if the value obtained is less than the lower limit a fault in the cylinder operation is assumed to have occurred. This fault measurement and analysis procedure is repeated a prescribed number of times and if the problem continues to occur over a predetermined consecutive number of measurements, then a fault indication is generated.

47 Claims, 7 Drawing Figures

FIG. 5. EMD 645E3 ENGINE COMPRESSION AND FIRING SAMPLE TIMING

| CYL. NO. | TDC TOOTH NO. | BEGIN COMP NO. | BEGIN FIRING NO. |
|---|---|---|---|
| 1 | 0 | 247.0 | 262.0 |
| 2 | 198.0 | 181.0 | 196.0 |
| 3 | 66.0 | 49.0 | 64.0 |
| 4 | 132.0 | 115.0 | 130.0 |
| 5 | 148.0 | 131.5 | 146.5 |
| 6 | 82.5 | 65.5 | 80.5 |
| 7 | 214.5 | 197.5 | 212.5 |
| 8 | 16.5 | 263.5 | 14.5 |
| 9 | 33.0 | 16.0 | 31.0 |
| 10 | 231.0 | 214.0 | 229.0 |
| 11 | 99.0 | 82.0 | 97.0 |
| 12 | 165.0 | 148.0 | 163.0 |
| 13 | 181.5 | 164.5 | 179.5 |
| 14 | 115.5 | 98.5 | 113.5 |
| 15 | 247.5 | 230.5 | 245.5 |
| 16 | 49.5 | 32.5 | 47.5 |

FIG. 6.

ENGINE MONITORING SYSTEM

FIELD OF THE INVENTION

The present invention is directed to a system for monitoring the condition and performance of engine cylinders of an internal combustion engine, especially a diesel engine.

BACKGROUND OF THE INVENTION

With the continuing need for obtaining better performance, fuel economy and polution control of internal combustion engines, systems have been developed which attempt to monitor the condition and the operation of the engine by observing the health and performance of its cylinders. Unfortunately, many of these systems suffer from undesirable drawbacks due to the manner in which they sense and/or analyze the data. For example, some systems attempt to monitor the engine condition by providing a sensor for each engine cylinder, which increases the cost of the system because of the number of sensors employed. Other systems couple the sensors to the engine such that the sensors are exposed to high pressures and temperatures within the cylinders, making the data output unreliable due to sensor failures and also increasing the cost because of the need to replace the damaged sensors. Attempts to avoid sensor failures of this type by installing the sensors in the engine wall have proved difficult to implement.

From a data analysis standpoint, previous approaches do not accommodate the many variables that are introduced into the signal outputs by the placement of the sensors on different cylinders or the different operating modes of the engine. Moreover, conventional approaches lack adequate signal to noise ratios or repeatablility due to the fact that they measure only a small portion of the stress that is generated by the cylinder pressure.

SUMMARY OF THE INVENTION

The present invention overcomes these shortcomings of the prior art by providing a pressure sensor that is mounted external to the cylinder but which is easily fitted to any type of cylinder and has a mounting configuration such that it is capable of monitoring the pressures within two adjacent cylinders. The signal output of the sensor is filtered to remove undesired engine noise and blank out those signals which are unrelated to compression and firing, thereby reducing errors in the signal output.

For this purpose, the present invention employs a ring or annular-shaped sensor mounted on a crab foot which bridges a pair of cylinders and contains a bolt which is stressed by the internal pressures of the cylinders. Since the stressing of the bolt is directly related to the pressures of the cylinders, the ring-shaped sensor produces output signals representative of the pressure variations in the adjacent cylinders that are bridged by the crab foot. The signals that are produced are measured relative to the top dead center of a respective cylinder of interest. After filtering the signals to reduce noise, a successive number of samples related to compression and firing are obtained to provide an adequate number of signals which will average out mechanical and electrical noise. From the successive samples, a straight line approximation of the slope of the cylinder pressure curve, relative to crank angle, is obtained. The derived slope values are compared with upper and lower limits to determine whether or not the pressure within the engine cylinder of interest is acceptable. If the upper limit is exceeded or if the value obtained is less than the lower limit, a fault in the cylinder operation is assumed to have occurred. This fault measurement and analysis procedure is repeated a prescribed number of times and if the problem continues to occur over a predetermined consecutive number of measurements, then a fault indication is generated.

In establishing the upper and lower limits relative to which the signal samples are evaluated, initial operation values are employed during initialization or set up time in order to factor out location variables, sensor calibration inaccuracies and variables introduced by the different operating modes of the engine. These values are referenced via a lookup table under processor control for evaluating the pressure signals. In carrying out the signal analysis procedure, a prescribed time delay is introduced for each change in operation mode in order to allow for the occurrence of noise transients. The various portions of the signal sampling and analysis scenario are fully programmable with respect to the timing sequences employed, number of engine cylinders monitored and the type of stress waves which are to be analyzed, so that the present invention may be applied to a variety of engine designs.

DETAILED DESCRIPTION OF THE INVENTION

Figure 1:
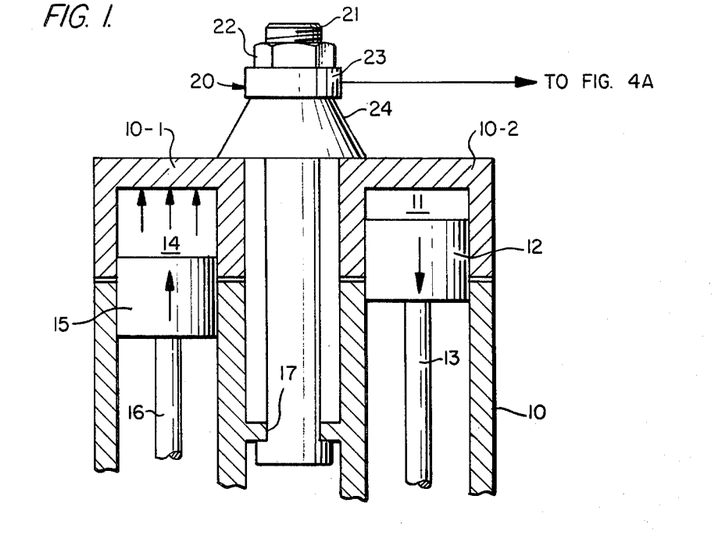
FIG. 1 is a partial sectional view of the arrangement of a stress wave sensor mounted via a crab foot bridging a pair of engine cylinders.
Figure 2:
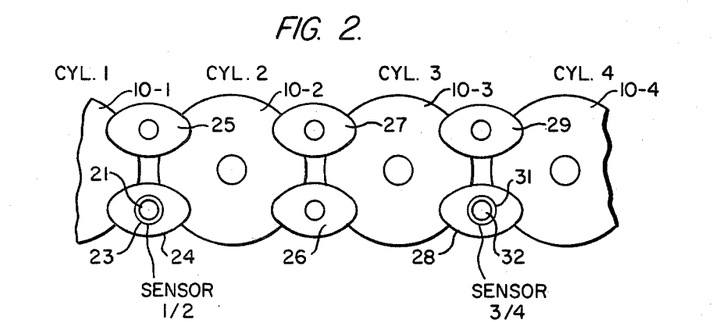
FIG. 2 is a partial plan view of a portion of an engine showing a plurality of adjacent cylinders and the manner in which the sensors are mounted on adjacent cylinders via the crab foot bolts.

Referring now to FIGS. 1 and 2, there are shown respectively a partial sectional view and plan view of portions of engine cylinders of which a crab foot mounted stress wave sensor may be employed for providing cylinder pressure signals to be analyzed in accordance with the present invention. As shown in FIG. 1, a single crab foot 24 and an associated stress wave sensor 23 are employed for detecting the pressures within adjacent cylinders having compression chambers 11 and 14. For purposes of the present description, it may be assumed that the environment in which the invention is employed is a sixteen cylinder locomotive diesel engine. However, it should be understood that the invention is not limited thereto but is applicable to various types of internal combustion engines. FIG. 1 illustrates the mounting of a transducer 23 for cylinders numbers 1 and 2 of the diesel engine. Cylinder No. 1 has a cylinder head 10-1 which, together with piston 15, defines the volume of compression chamber 14. Rod 16 extends from piston 15 to an output drive coupling. Similarly, for cylinder No. 2, cylinder head 10-2, together with the piston 12, defines the displacement or volume of compression chamber 11, with rod 13 extending from piston 12 to a suitable drive output coupling. A bolt 21 passes through an aperture 17 in the engine case and through apertures in crab foot 24, annular or ring-shaped shaped stress wave sensor 23 and a nut 22. As nut 22 is tightened upon ring-shaped sensor 23, the sensor is secured between the nut and the crab foot and the crab foot 24 frictionally engages the tops of the cylinder heads 10-1 and 10-2. With this arrangement, for changes in pressure within the respective cylinders, a corresponding stress is created in the bolt 21. The stress is detected by sensor 23 which provides analog output signals representative of a composite stress wave from cylnders No. 1 and 2. An adjacent crab foot 25, shown in FIG. 2, but absent a sensor, is also coupled to cylinders 1 and 2. Additional crab feet 26-29 are coupled between cylinders No. 2 and 3 and cylinders No. 3 and 4, as shown in FIG. 2. No sensor is provided in the crab foot arrangement between cylinders No. 2 and 3 but rather between cylinders No. 3 and 4 in a configuration similar to that for cylinders No. 1 and 2, as shown in FIG. 2. Namely, a ring sensor 31 is held in place by a nut which threadingly engages bolt 32 which forms part of the crab foot. Thus, for a sixteen cylinder configuration of the diesel engine environment of the present example, there will be a total of eight stress wave sensors mounted between respective cylinders 1-2, 3-4, 5-6, 7-8, 9-10, 11-12, 13-14 and 15-16.

Figure 6:
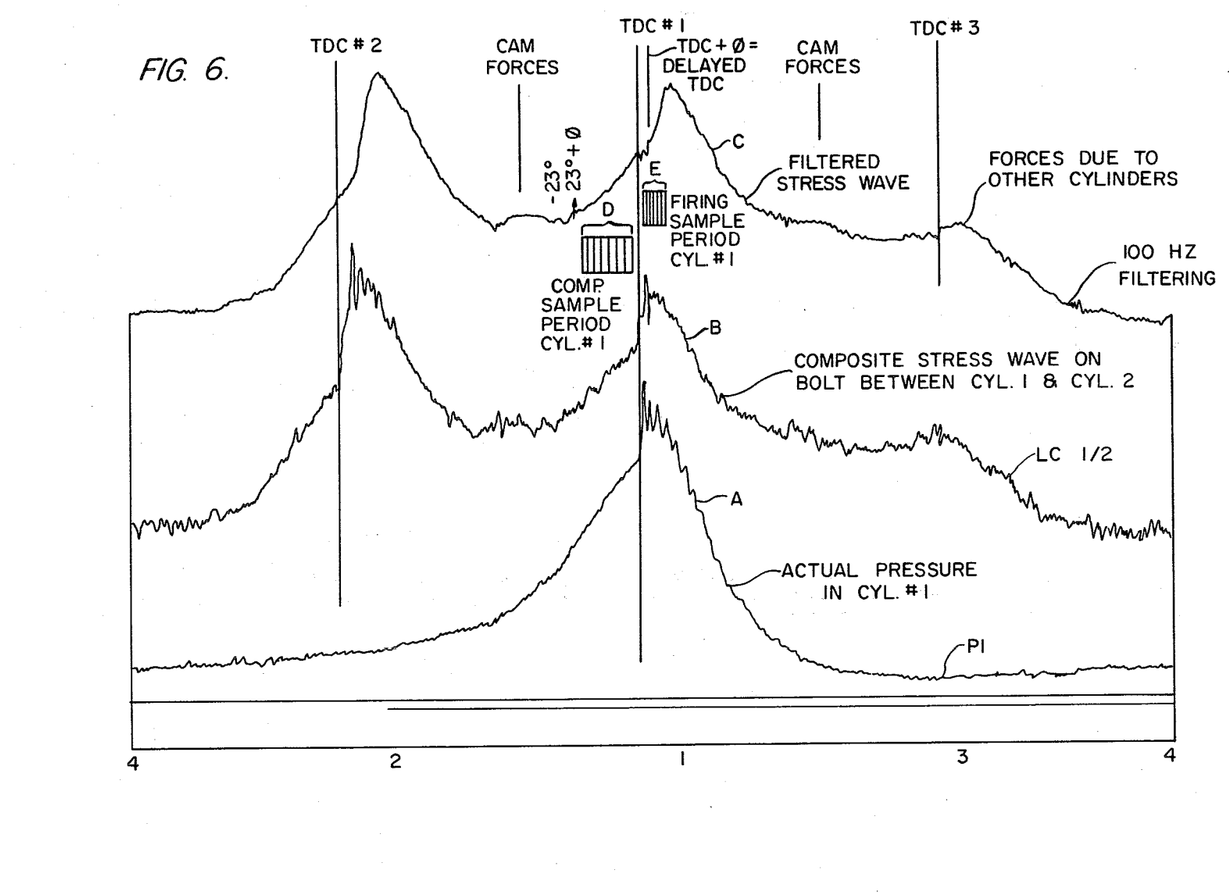
FIG. 6 shows engine pressure waveforms relative to ring gear rotation, as measured at a crab claw sensor bridging the first and second cylinders of a sixteen cylinder engine, values for which are tabulated in FIG. 5.

During a single cycle of rotation of the ring gear for the diesel engine, the pressure wave in an individual cylinder, such as cylinder No. 1, varies as shown in curve A of FIG. 6. As shown therein, the cylinder pressure has a peak in the neighborhood of the top dead center location of the piston for that cylinder. For a sensor positioned to measure the composite pressure for a pair of adjacent cylinders, for example, cylinders No. 1 and 2 as shown in FIGS. 1 and 2, there will be obtained a resultant curve B shown in FIG. 6 which contains a pair of significant peaks in the neighborhood of top dead center positions for the pistons and cylinders No. 1 and 2 as shown. Namely, the major contribution of the pressure wave is obtained from the adjacent cylinders being measured with the effects of the mechnical mounting arrangements and characteristics of the other cylinders, while contributing to the resultant overall curve, having only minor significance. This is best illustrated in FIG. 6 in considering the crank angle displacement relative to the top dead centers of cylinders No. 1 and 2. Namely, for a 90° displacement from the top dead center position to cylinder piston No. 1 to the top dead center position of cylinder piston No. 3, there is a substantial decrease in the pressure detected at cylinder No. 1 and for a 180° shift (TDC of cylinder No. 4) from the top dead center position of cylinder No. 1, the sensor output is substantially negligible.

As will be explained below in conjunction with the description of the signal measuring components shown in FIGS. 4A and 4B, the output of the stress wave sensor for a pair of adjacent cylinders, such as cylinders No. 1 and 2 illustrated as curve B in FIG. 6, is filtered to obtain the resultant waveform shown as curve C in FIG. 6.

Figure 3:
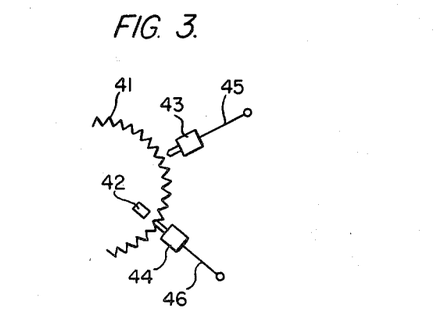
FIG. 3 is a mechanical schematical view of the mounting of a top dead center sensor and a ring gear tooth rotation sensor relative to the engine ring gear.

For obtaining proper timing of the operation of the engine relative to the ring gear rotation, a top dead center detection target 42 is affixed to ring gear 41 and a magnetic pickup sensor 44 is positioned at a prescribed rotational location relative to ring gear 41 to produce an output for the top dead center position of a selected cylinder of interest, here cylinder No. 1. Thus, output line 46 from top dead center sensor 44 produces a top dead center representative signal as target 42 passes by the magnetic pickup 44. Similarly, a timing signal generator consisting of a magnetic ring gear tooth detector 43 is positioned adjacent the teeth of the ring gear 41 so that as each tooth passes by the magnetic pickup, there is a variation in the magnitude of the signal on line 45. As is conventional in the art, this signal typically has a pair of opposite polarity portions succeeding one another as a ring gear tooth approaches and passes by the magnetic pickup.

Figure 4A:
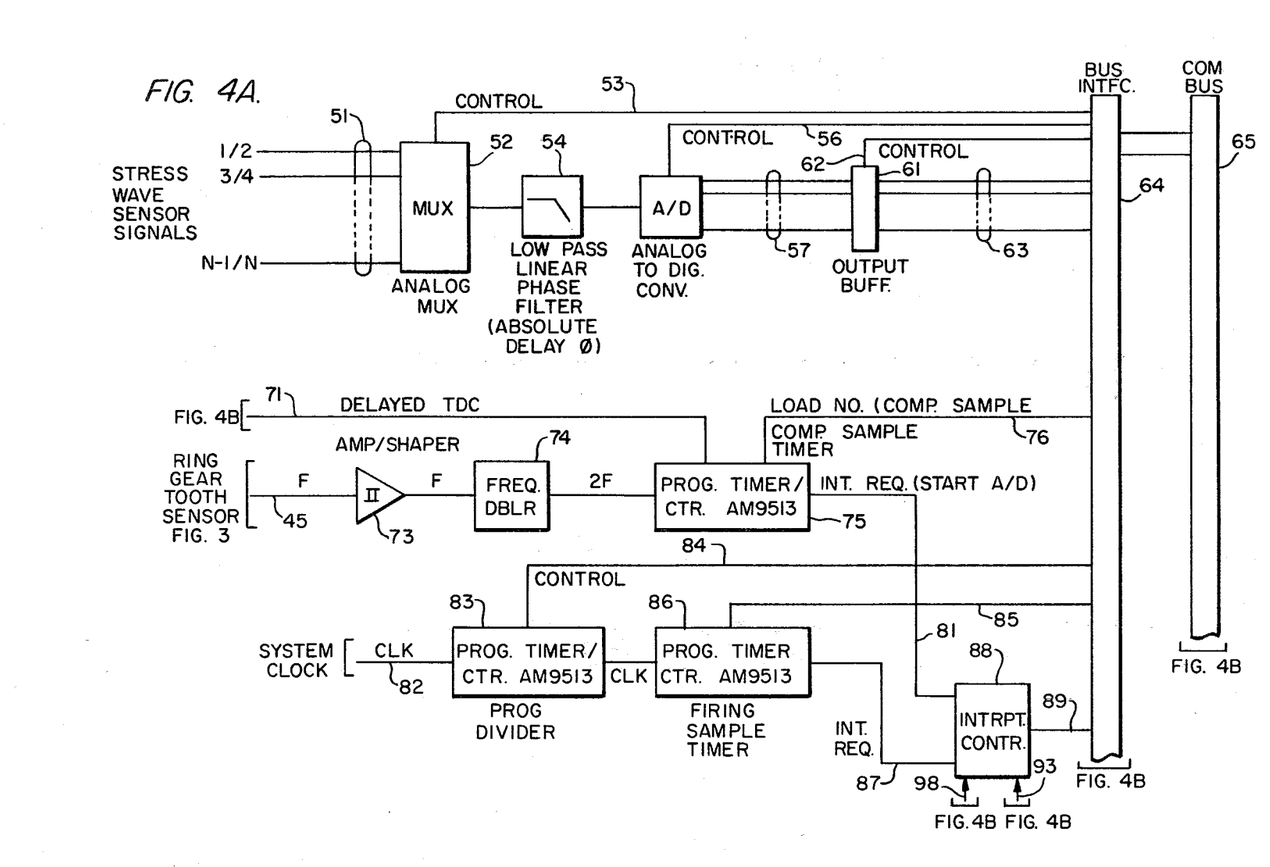
FIGS. 4A and 4B are a schematic block diagram illustration of the signal processing portions of an engine signal analyzer which is coupled to receive the outputs of the crab foot sensors attached to the engine cylinders shown in FIGS. 1 and 2.
Figure 4B:
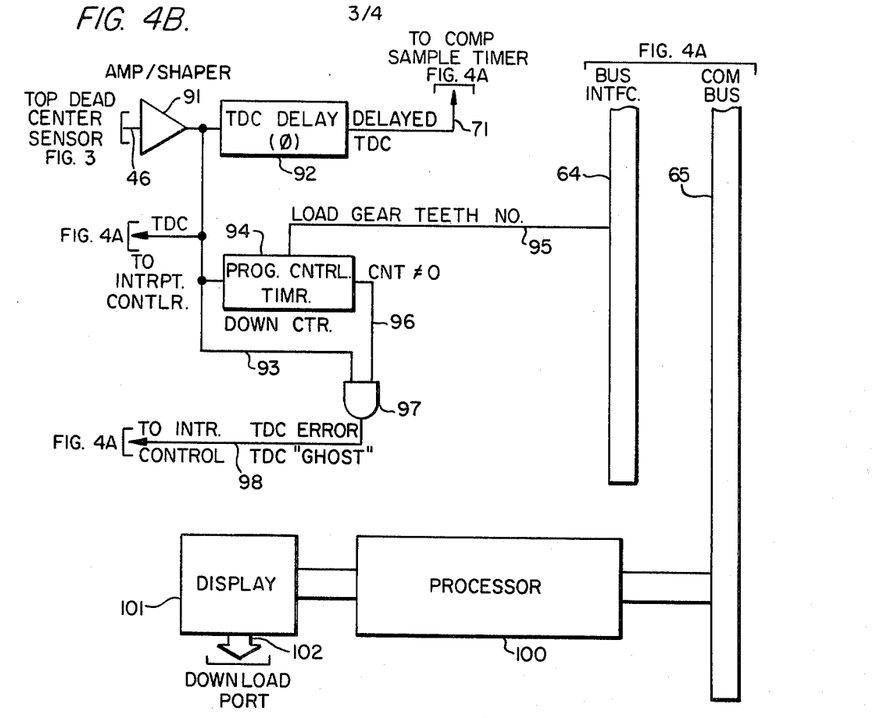

Before describing, in detail, the signal processing scheme illustrated in FIGS. 4A and 4B that may be employed in accordance with the present invention, it should be observed that the present invention resides primarily in a novel structural combination of conventional signal processing circuits and not in the particular detailed configurations thereof. Accordingly, the structure, control and arrangement of these conventional circuits have been illustrated in the drawings by readily understandable block representations and schematic diagrams, which show only those specific details that are pertinent to the present invention, in order not to obscure the disclosure with structual details which will readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations of FIGS. 4A and 4B do not necessarily represent the mechanical structural arrangement of the exemplary system, but are primarily intended to illustrate the major structural components of the system in a convenient functional grouping, whereby the present invention may be more readily understood.

Referring now to FIGS. 4A and 4B, the electronic signal processing portion of the present invention is illustrated as processor-controlled system. The processor 100 proper communicates with the other components of the system over a communication bus 65. Communication bus 65 is coupled through a bus interface circuit 64 to the various signal timing and data input circuits to be described below. The processor 100 itself is formed of conventional components including a read only memory portion, a random access memory portion and a central processing unit intercoupled with one another to carry out the signal processing and control functions of the invention to be detailed below. As specific details of such circuitry is not necessary for an understanding of the present invention they will not be described here. Rather, the manner in which the processor interacts with the other portions of the system and the signal input/output and control functions will be described. The processor may also include a separate mathematical or algorithm processor for carrying out calculations for obtaining a best fit line approximation of the data points with pressure curve characteristics shown in FIG. 6. It may further include an associated bubble memory to provide non-volatile storage for fault records generated in accordance with the operational scenario to be described below. An indication of any fault may be displayed on a display panel 101 and signals representative thereof may be available at a down load port 102. For data communication purposes standard synchronous data link communication signalling formats such as an RS 232 data format may be employed.

Referring to FIG. 4A, the signal output lines from the various sensors 23 that are coupled to respective pairs of the cylinder heads correspond to input signal lines 51 that are coupled to multiplexer 52. In accordance with a control signal supplied over control line 53 from processor 100, multiplexer 52 selects one of the pairs of cylinders of interest ($\frac{1}{2}$, $\frac{3}{4}$, . . . 15/16) and couples a respective one of input lines 51 to the output of the multiplexer for application to a linear phase low pass filter 54. Filter 54 is comprised of a linear phase (Bessel) low pass filter (having an inherent absolute phase delay) and filters the sensor waveform coupled through multiplexer 52 at approximately 100 Hz. Thus, if multiplexer 52 is controlled to select the input signal line associated with cylinders 1 and 2, its output will represent the sensor signal associated with those cylinders as illustrated in curve B of FIG. 6. Low pass linear phase filter 54 then filters the signal and supplies an output corresponding to the signal shown as waveform C in FIG. 6. This signal is applied to an analog to digital converter 55. Analog to digital converter 55 is enabled by a control signal on line 56 from the processor. When enabled, A/D converter 55 converts the value of the filtered waveform at the sample time of interest to a quantized digital signal and supplies the quantized data over line 57 for temporary storage in an output buffer 61. Buffer 61 is controlled by a control line 62 from the processor. Control line 62 is employed to read out data into the processor for storage in memory during data write operations. The outputs of the buffer 61 are coupled over lines 63 to the data portion of the communication link to the processor.

Timing signals representative of the rotational position of the ring gear which defines the operational states of the various cylinders of the engine are provided over lines 45 and 46 as discussed above in conjunction with FIG. 3. Line 46 is coupled to the output of the top dead center sensor 44 through an amplifier shaper 91 to a top dead center delay circuit 92. Top dead center delay circuit 92 provides a delay equal to the inherent phase delay of low pass linear phase filter 54 in order to assure proper synchronization of the signals that are sampled and written into processor memory. The output of delay circuit 92 is coupled over signal lines 71 as a delayed top dead center signal to a programmable timer counter 75. Line 71 is used to enable counter 75 so that it may begin counting pulse signals provided over line 45 from ring gear 41 to sensor 43, the signals being shaped by an amplifier shaper 73 and a frequency doubler 74. Frequency doubler 74 provides a timing pulse for each leading and trailing edge of the ring gear pulse during rotation of the ring gear 41 past detector 43. Counter 75 may comprise a programmable down counter which is loaded with an initial reference value from the processor supplied over link 76. When enabled by a delayed top dead center signal on line 71, programmable timer 75 begins counting down from the value supplied over line 76 in response to timing pulses or gear tooth pulses supplied from the frequency doubler 74. When programmable timer 75 counts down to zero, it generates an output corresponding to an interrupt request over line 81. Line 81 is coupled to an interrupt controller 88, the output of which is coupled over line 89 to the processor communication bus via the bus interface circuit 64. The interrupt request on line 81 corresponds to an analog-to-digital converter interrupt request which causes the processor to enable analog-to-digital converter 55 via link 56, so that the value of the sensor waveform at the time of the interrupt will be sampled for storage in processor memory.

Programmable timer 75 is employed for governing the initiation and successive sampling of portions of the signal waveform C shown in FIG. 6 at a prescribed compression portion of the cylinder output characteristic just prior to the top dead center peak. As will be explained below, for a successive number of gear tooth rotation or timing intervals, samples of the composite stress wave form are produced and loaded into the processor, from which a best fit line approximation of the slope of this portion of the wave form may be obtained for diagnostic test purposes.

The initiation and the duration of a firing sample period, which follows the compression sample period, delineated by sample period E associated with composite wave form C shown in FIG. 6, is carried out by a programmable divider 83 and an associated firing sample timer 86. Programmable divider 83 is coupled to receive a system clock signal coupled over line 82 and divides system clock pulses by an appropriate divisor to produce output pulses at a selected timing rate corresponding to the desired sampling frequency. For purposes of the present description, this may be assumed to be on the order of 0.2 ms. Thus, 0.2 ms clock pulses will be produced at the output of divider 83. As mentioned above, divider 83 is programmable via link 84, so that the circuitry is readily adaptable to various types of engines. The clock pulses supplied from divider 83 are coupled to a firing sample timer 86 which counts down a preloaded count supplied over line 85 from the processor to a prescribed value (e.g. zero) and then generates an output corresponding to an interrupt request over link 87.

Link 87, like link 81, is coupled to interrupt controller 88, which again instructs the processor to enable analog-to-digital converter 55 via control line 56. Thus, during the firing sample period E, associated with curve C as shown in FIG. 6 referenced above, the combined operation of divider 83 and firing sample timer 86 will cause the processor to sequentially enable analog-to-digital converter 55 for successive sampling (at a much higher rate than during the compression sample period) of a portion of the signal waveform just prior to its peak, and just subsequent to the top dead center position on the waveform. As noted above, the compression sample period is just prior to the top dead center portion of the waveform for the cylinder of interest whereas the firing sample period is just subsequent to the top dead center portion for the cylinder. Interrupt controller 88 is coupled to an additional pair of lines 98 and 93 which are associated with a top dead center error detecting circuit shown in the upper portion of FIG. 4B.

Figure 5:
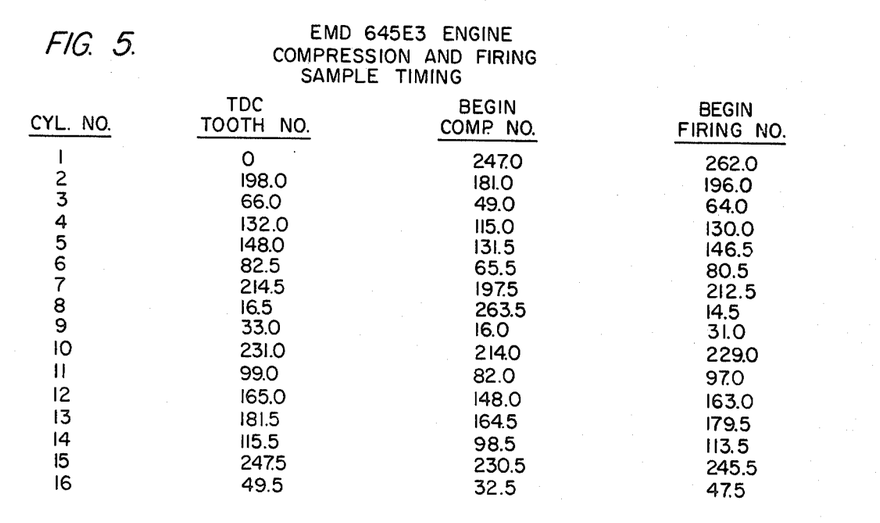
FIG. 5 is a table of compression and firing sample timing values for a sixteen cylinder diesel engine used explaining the operation of the signal analysis components of FIGS. 4A and 4B.

More particularly, as pointed out previously, the top dead center sensor signal coupled over line 46 is supplied to an amplifier shaper 91. The output of the amplifier shaper 91, in addition to being coupled to the delay circuit 92, it is coupled over line 93 to a programmable counter 94 and to one input of AND gate 97. Line 93 is employed to enable interrupt controller 88 in response to the top dead center signal over line 46. Line 98, on the other hand, is employed to disable the interrupt controller to prevent the processor from responding to interrupts that are generated in response to an erroneously produced top dead center signal. More specifically, for each respective engine cylinder, the top dead center position of that cylinder may be defined in accordance with the rotation of the ring gear, by counting the number of teeth of the ring gear passing by the top dead center position sensor relative to some reference point. Using the top dead center position of cylinder No. 1 as a zero reference point, then for every other cylinder, there will be some number of gear teeth that will rotate relative to the pick up which will delineate the position at which the piston in the particular cylinder of interest was reached top dead center. Referring to the table shown in FIG. 5, for a ring gear having 264 gear teeth, for a firing sequence 1-3-4-2, as shown, and assigning top dead center as a 0 count for cylinder No. 1, then cylinder No. 3, the next cylinder to fire, which is displaced 90° from the standpoint of the rotation of the ring gear relative to the position of top dead center of cylinder No. 1, will provide a gear tooth count of 66 or one-fourth of the 264 gear teeth of the ring gear. Similarly, proceeding around the ring gear, cylinder No. 4, which fires next, has a reference count of 132, whereas cylinder No. 3, the last of the quartet of the group of four to fire with an exact 90° phase displacement relative to cylinder No. 1, has a count of 198 as its reference point at which a top dead center signal is produced. These respective values, for each cylinder of interest, are selectively supplied over link 95 from the processor and loaded into programmable downcounter 94. When a top dead center signal is produced from sensor 46, counter 94 begins counting down from the value initially loaded therein. If, during the process of counting down, another signal is produced over link 46, AND gate 97 is enabled, thereby suppling a signal over line 98 to disable interrupt controller 88. Namely, there may be some circumstance where mechanical or electrical noise will produce a ghost top dead center signal is correct so that it aborts the interrupt routine. Counter 94 and associated AND gates 97 provide this safeguard.

OPERATION

The description of the operation of the system of the present invention will be divided into two segments. The first segment will treat the manner in which electronic signal processing circuitry described above operates to successively sample portions of the composite stress waveform of the respective cylinder pairs and load the sampled data into the processor. The second portion of the description will treat the manner in which the processor operates on the signal samples to determine whether or not the respective cylinders are operating properly or whether a fault condition has occurred.

SIGNAL SAMPLING AND DATA INPUT COMPRESSION DATA SAMPLING

As described above, persuant to the present invention, the health and performance of the engine is monitored by observing selected portions of the composite stress waveform between a pair of respective cylinders, with a composite stress wave being analyzed relative to each of the cylinders of interest, so as to focus upon a compression sample period and a firing sample period for those particular cylinders. Referring again to FIG. 6, the composite signal waveform shown in curves B and C may be analyzed with respect to cylinders No. 1 and 2. In the region of the top dead center position of cylinder No. 1, the waveform form is analyzed to determine a best fit approximation of the slope of portions for a compression sample interval and a firing sample interval delineated by intervals D and E. Similarly, although its respective compression sample and firing sample intervals are not delineated in FIG. 6, cylinder No. 2 may be analyzed from the same composite waveform by evaluating the slope of the composite curve within the region of the top dead center position of cylinder No. 2, which is separated by 90° from the top dead center position of cylinder No. 1, so that a determination of the characteristics of cylinder No. 2 may be obtained from the same waveform that produces characteristics for cylinder No. 1.

Referring now to FIGS. 4A, 4B, 5 and 6, it will be assumed that the signal analysis program stored in ROM within the processor 100 analyzes the cylinders in succession, namely beginning with cylinder No. 1 and ending with cylinder No. 16, for the sixteen cylinder engine of interest. In this regard, the characteristics shown in the table and FIG. 5 and the stress waveform shown in FIG. 6 corresponds to an EMD 645 E3 engine. Considering cylinder No. 1 as the first cylinder of interest, processor 100 supplies a control signal over line 53, so that the composite waveform B(FIG. 6) supplied from sensor 23 is coupled over the selected one of lines 51 through multiplexer 52 and filtered in low pass filter 54 to produce the filtered stresswave C shown in FIG. 6. By way of line 76, a gear tooth reference numer (247 as shown in the table in FIG. 5) is loaded into programmable down counter or compression sample timer 75 from the processor. When a top dead center signal is produced from sensor 44, it is delayed by delay circuit 92 and coupled over line 71, to enable down counter 75. Once enabled, down counter 75 begins counting ring gear tooth pulses supplied by frequency doubler 74. Assuming that there are no ghost or erroneous TDC signals produced, then counter 75 will count down to 0 and produce an interrupt request over line 81. Interrupt controller 88 supplies this interrupt request over line 89 to the processor which, in turn, generates an enable signal over line 56, so that analog-to-digital converter 55 may sample the value of the composite waveform at that point. Namely, from the point at which a top dead center signal is produced from sensor 44 to the point of which A/D converter 55 begins sampling the composite filtered stress waveform C for a cylinder No. 1, 247 gear teeth will pass by the top dead center sensor 44 and, likewise, ring gear tooth sensor 43. For a 264 gear tooth arrangement, the sampling interval begins 17 gear teeth prior to the location of top dead center.

Analog-to-digital converter 55 samples the analog value of the filtered composite waveform and couples the resulting quantized digital code for storage into an output buffer 61. When the processor is ready to load the contents of the buffer 61 into internal memory, it supplies a transfer control signal over line 62, so that the sampled data stored in buffer 61 may be coupled over link 63 to the random access memory within the processor.

At the same time the processor also supplies a new sample value over line 76, for example the number two or the number four, depending upon the output of frequency doubler 74 to down counter 75. Where two pulses are produced for every rotation of a single gear tooth past the gear teeth sensor, processor 100 may supply the number four over link 76 to be loaded into counter 75. Counter 75 then down counts four pulses or two gear teeth positions before generating another interrupt request over line 81. This results in a new sampling of the output of sensor 23 for cylinders No. 1 and 2; namely A/D converter 55 samples the filtered composite waveform C after a rotation of two gear teeth past sensor 43.

Within an internal soft-counter, processor 100 keeps track of the number of samples being successively obtained from the sensor output. For example, an internal soft-counter may be initially loaded with the value of eight, down count to zero and then produce a sample disable request for the compression sample interval. This would correspond to a rotation of 14 gear teeth past the ring gear rooth sensor 43 subsequent to the position at which compression sample timer 75 first caused an interrupt request to be generated, namely from the value 247 shown in the table in FIG. 5. At the end of the sampling interval, considering that eight successive samples of the filtered compression curve have been digitized and stored in memory, processor 100 begins a best fit straight line approximation for the composite compression curve relative to cylinder No. 1 in the region D of the sample period shown in FIG. 6. It also determines the slope (m) of this line and compares the slope value with respective limits for determining a fault condition, as will be delineated more specifically below.

FIRING DATA SAMPLING

After a prescribed delay subsequent to the loading of the last sample of the filtered composite stress waveform at the end of the compression sample period, the processor enables counter 86 and loads it with a value corresponding to the number of samples to be taken for the firing sample interval. Again, assuming that eight samples will be taken, just as eight samples were derived for the compression sample period, firing sample timer 86 begins counting down from its initial value of eight to zero. The 0.2 ms clock pulses that are coupled to the firing sample timer 86 are also coupled to line 87 as interrupt requests, in response to which the processor successively enables the A/D converter via line 56, to load successive samples from the composite filter stress waveform into internal memory. This is carried out in the same manner described above in connection with the compression sample period, except that the times of occurrence of the successive samplings are carried out independently of the rotation of the gear teeth; namely, they are associated with a prescribed internal system clock having the exemplary repetition period 0.2 ms. Thus, for the firing sample period E shown in FIG. 6, samples are extracted at a higher frequency then during the compression sample period D.

For the second and subsequent cylinders, different ring gear teeth numbers are loaded into the programmable compression sample timer 75, as illustrated in FIG. 6, so that the proper locations on the filtered composite stress waveform relative to the cylinders of interest will be sampled and loaded into the processor memory.

SIGNAL ANALYSIS ALGORITHM

Once a set of data samples, for each respective compression sample period and the firing sample period have been loaded into processor memory, a signal analysis algorithm for the cylinder of interest is carried out. The signal analysis algorithm is a best-fit-line algorithm to determine the slope of the straight line approximation over the sample period of interest. Algorithms for carrying out straight line approximations and best-line-fits to produce values indicative of slope are well known and will not be described here. Suffice is to say that the algorithm processing portion of the processor has been programmed to carry out such a slope determination. Once a slope value (m) has been obtained, each slope value is normalized by adding an offset to the slope value from the best-fit-line approximation.

During a selected time within the operation of the system, an initial slope value for each cylinder is derived from this operation and loaded into a separate portion of memory to be accessed during subsequent signal processing. This is normally carried out during download/upload processing. More specifically, over a series of successive engine cycles, a plurality of slope values are extracted and averaged, to produce an average initial value which is stored in the non-volatile memory, namely the bubble memory referenced previously. Thus, an initial value is stored for each of the sixteen cylinders of the engine of interest and such initial values are produced for each engine operating mode. These initial values are stored as a series of lookup tables which will be accessed for subsequent diagnostic testing in accordance with the particular engine operating mode.

Now, during performance analysis, each time that the samples are stored and slope values are determined therefrom, the initial value slope stored in the lookup table is subtracted from the sum of the calculated slope and the offset value referenced previously. This remainder is compared to prescribed high and low limits which have been stored in the non-volatile memory. If the remainder value exceeds one of these limits, namely, if the remainder is greater than the upper limit or less than the lower limit, a fault condition is identified. Over a prescribed number of engine revolutions, this process is continued for each respective cylinder to determine if the fault condition is a continuous one or simply erratic. Namely, a soft accumulator is employed to count the number of detected faults, namely the number of instances in which the remainder value exceeds the upper limit or is less than lower limit. If a prescribed consecutive number of faults is accumulated, the processor generates an output signal to the display panel 101 which energizes a failure lamp associated with that respective cylinder and a record of the fault is stored in memory. Associated with this stored record, another software accumulator may be employed to provide the cumulative time during which a given fault condition exists. For this purpose, the software accumulator may be successively enabled to count system clock pulses in response to a fault condition and then disabled when the fault condition disappears. As a result, the soft counter may be accessed to determine the cumulative time for which a given fault condition exists. The above process is carried out for both the compression sample period and the firing sample period, so that a determination of the condition and performance of the engine may be derived by analyzing a composite stress wave indicative of the pressure conditions within respective pairs of cylinders. By analyzing the composite stress wave from the standpoint of a compression sample interval and a firing sample interval, and comparing the resultant slopes with stored lookup tables associated with the operating modes of the engine, an accurate determination of the operational condition and performance may be obtained.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with an internal combustion engine, an arrangement for analyzing the operation of said engine comprising:

first means, adapted to be coupled to said engine, for producing an output signal representative of at least one prescribed characteristic of a plurality of cylinders of said engine; and second means, coupled to said first means, for selectively analyzing said output signal and producing therefrom an output representative of the operation of a selected one of said plurality of cylinders.

2. An arrangement according to claim 1, wherein said first means comprises means, adapted to be coupled to a respective pair of cylinders of said engine, for producing an output signal representative of the composite pressure characteristics within said pair of cylinders.

3. An arrangement according to claim 1, wherein said first means comprises a bolt assembly mounted to said pair of cylinders and a stress wave transducer mounted to said bolt, whereby characteristics of the pressure in said cylinders are manifested as a characteristics of the stress of said bolt, so that the output of said stress wave transducer is representative of the composite pressure characteristic in said pair of cylinders.

4. An arrangement according to claim 3, wherein said bolt assembly includes a crab foot coupling assembly affixed to between the engine case and the cylinder heads of said pair of cylinders.

5. An arrangement according to claim 1, wherein said second means comprises means for generating a timing signal representative of the crank angle of said engine and means for selectively sampling the output signal produced by said first means in accordance with a prescribed relationship between said timing signal and said selected one of said plurality of cylinders.

6. An arrangement according to claim 5, wherein said second means comprises means for selectively sampling the output produced by said first means during respective compression sampling and firing sampling intervals associated with said selected one of said plurality of cylinders.

7. An arrangement according to claim 5, wherein said second means comprises means for generating a prescribed number of pulses during each complete cranking cycle of said engine and said selective sampling means includes means for counting a selected number of said pulses determined in accordance with said selected one of said plurality of cylinders.

8. An arrangement according to claim 7, wherein said selective sampling means includes means for sampling the output produced by said first means during a compression sampling interval initiated in response to said counting means having counted said selected number of said pulses.

9. An arrangement according to claim 8, wherein said selective sampling means includes means for sampling the output produced by said first means during a firing sampling interval in response to the completion of said compression sampling internal.

10. An arrangement according to claim 8, wherein said second means includes means for enabling said counting means in response to detecting that the piston of said selected one of said plurality of cylinders has reached a prescribed position relative to its top dead center position.

11. An arrangement according to claim 10, wherein said second means includes means for disabling said counting means in response to detecting that the piston of said selected one of said plurality of cylinders has reached said prescribed position relative to its top dead center position subsequent to the enabling of said counting means but prior to said counting means having counted said selected number of pulses.

12. An arrangement according to claim 1, wherein said first means comprises means for producing an output representative of the composite pressure characteristic of each of said plurality of cylinders of said engine.

13. An arrangement according to claim 12, wherein said second means includes means for generating respective values representative of the slope of said composite pressure characteristic for respective compression and firing intervals associated with said selected one of said plurality of cylinders.

14. An arrangement according to claim 13, wherein said second means includes means for subjecting said respective slope values to a prescribed relationship defining a prescribed degree of performance of said selected one of said plurality of cylinders and generating an output signal representative of the performance of said selected cylinder.

15. An arrangement according to claim 13, wherein said second means includes means for repetitively subjecting said respective slope values to a prescribed relationship defining a prescribed degree of performance of said selected one of said plurality of cylinders over a predetermined number of engine cycles and generating an output signal representative of the performance of said selected cylinder over the duration of said predetermined number of engine cycles.

16. An arrangement according to claim 15, wherein said second means includes means for generating an output signal representative of a fault condition in said selected cylinder in response to either of said slope values falling outside a range of values associated with said prescribed degree of performance over said duration of said predetermined number of engine cycles.

17. An arrangement according to claim 13, wherein said second means includes means for selectively generating respective averages of the respective values representative of the slope of said composite pressure characteristic for respective compression and firing intervals associated with said selected one of said plurality of cylinders over a preestablished number of engine cycles.

18. An arrangement according to claim 17, wherein said second means includes means for repetitively subjecting said respective slope values to a prescribed relationship between said slope values and said respective averages thereby defining a prescribed degree of performance of said selected one of said plurality of cylinders over a predetermined number of engine cycles and generating an output signal representative of the performance of said selected cylinders over the duration of said predetermined number of engine cycles.

19. An arrangement according to claim 18, wherein said second means includes means for generating an output signal representative of a fault condition in said selected cylinder in response to either of said slope values falling outside a range of values associated with said prescribed degree of performance over said duration of said predetermined number of engine cycles.

20. A method of monitoring the operation of an internal combustion engine comprising the steps of:
   (a) measuring at least one prescribed characteristic of a plurality of cylinders of said engine, and generating, for said plurality of cylinders, and output signal representative of the composite of the measured at least one prescribed characteristic of said plurality of cylinders; and
   (b) selectively analyzing said measured composite characteristic representative signal and producing an output representative of the operation of a selected one of said plurality of cylinders.

21. A method according to claim 20, wherein step (a) comprises the step of generating, for a respective pair of cylinders, an output signal representative of the composite pressure characteristics within said cylinder.

22. A method according to claim 21, wherein step (a) is carried out external to said cylinders.

23. A method according to claim 21, wherein step (b) comprises the steps of
   (b1) generating a timing signal representative of the crank angle of said engine, and
   (b2) selectively sampling said output signal in accordance with a prescribed relationship between said timing signal and said selected one of said plurality of cylinders.

24. A method according to claim 23, wherein step (b2) comprises selectively sampling said output signal during respective compression sampling and firing sampling intervals associated with said selected one of said plurality of cylinders.

25. A method according to claim 23, wherein step (b1) comprises generating a prescribed number of pulses during each complete cranking cycle of said engine and step (b2) includes counting a selected number of said pulses determined in accordance with said selected one of said plurality of cylinders.

26. A method according to claim 25, wherein step (b2) includes sampling said output signal during a compression sampling interval initiated in response to having counted said selected number of said pulses.

27. A method according to claim 26, wherein step (b2) includes sampling said output signal during a firing sampling interval initiated in response to the completion of said compression sampling internal.

28. A method according to claim 26, wherein step (b2) includes the step of beginning said count in response to detecting that the piston of said selected one of said plurality of cylinders has reached a prescribed position relative to its top dead center position.

29. A method according to claim 28, wherein step (b2) includes terminating said count in response to detecting that the piston of said selected one of said plurality of cylinders has reached said prescribed position relative to its top dead center position subsequent to the beginning of said count but prior to having counted said selected number of pulses.

30. A method according to claim 21, wherein step (b2) includes the step of generating respective values representative of the slope of said composite pressure characteristic for respective compression and firing intervals associated with said selected one of said plurality of cylinders.

31. A method according to claim 30, wherein step (b2) further includes the steps of subjecting said respective slope values to a prescribed relationship defining a prescribed degree of performance of said selected one of said plurality of cylinders and generating an output signal representative of the performance of said selected cylinder.

32. A method according to claim 30, wherein step (b2) further includes the steps of repetitively subjecting said respective slope values to a prescribed relationship defining a prescribed degree of performance of said selected one of said plurality of cylinders over a predetermined number of engine cycles and generating an output signal representative of the performance of said selected cylinder over the duration of said predetermined number of engine cycles.

33. A method according to claim 32, wherein step (b2) includes the step of generating an output signal representative of a fault condition in said selected cylinder in response to either of said slope values falling outside a range of values associated with said prescribed degree of performance over said duration of said predetermined number of engine cycles.

34. A method according to claim 30, wherein step (b2) includes the step of selectively generating respective averages of the respective values representative of the slope of said composite pressure characteristic for respective compression and firing intervals associated with said selected one of said plurality of cylinders over a preestablished number of engine cycles.

35. A method according to claim 34, wherein step (b2) includes the steps of repetitively subjecting said respective slope values to a prescribed relationship between said slope values and said respective averages thereby defining a prescribed degree of performance of said selected one of said plurality of cylinders over a predetermined number of engine cycles and generating an output signal representative of the performance of said selected cylinder over the duration of said predetermined number of engine cycles.

36. A method according to claim 35, wherein step (b2) includes the step of generating an output signal representative of a fault condition in said selected cylinder in response to either of said slope values falling outside a range of values associated with said prescribed degree of performance over said duration of said predetermined number of engine cycles.

37. For use with an internal combustion engine, a transducer coupling arrangement comprising:
   first means for supporting a transducer; and
   second means for coupling said first means to a plurality of cylinders of said engine, whereby a transducer supported by said first means may produce an output signal waveform representative of prescribed composite characteristics of said plurality of cylinders.

38. An arrangement according to claim 37, further including a transducer affixed to said first means from which said output signal waveform may be derived.

39. An arrangement according to claim 37, wherein said second means comprises a bolt assembly mounted to a pair of adjacent cylinders and further including a stress wave transducer mounted to said bolt, whereby characteristics of the pressure in said adjacent cylinders are manifested as a characteristic of the stress of said bolt, so that the output of said stress wave transducer is representative of the composite pressure characteristic in said pair of adjacent cylinders.

40. An arrangement according to claim 39, wherein said bolt assembly includes a crab foot coupling assembly affixed to between the engine case and the cylinder heads of said pair of cylinders.

41. For use with an internal combustion engine a transducer coupling arrangement comprising:
 a plurality of first means for supporting a respective plurality of transducers; and
 a plurality of second means for coupling respective ones of said first means to sets of cylinders of said engine, whereby the respective transducers supported by said plurality of first means may produce a plurality of output signal waveforms representative of prescribed composite characteristics of said sets of cylinders.

42. An arrangement according to claim 41, further including a plurality of transducers respectively affixed to said plurality of first means from which said plurality of output signal waveforms may be obtained.

43. An arrangement according to claim 42, wherein said plurality of second means are arranged such that each cylinder has coupled thereto only a single transducer.

44. An arrangement according to claim 43, wherein each of said plurality of second means comprises a bolt assembly mounted to a pair of adjacent cylinders with a respective transducer being mounted to a respective bolt.

45. An arrangement according to claim 44, wherein each respective bolt assembly includes a crab foot coupling assembly affixed between the engine case and the cylinder heads of a respective pair of cylinders.

46. For use with an internal combustion engine having a plurality of N cylinders, a transducer coupling arrangement comprising:
 a plurality of (N/2) first means for supporting a respective plurality of (N/2) transducers; and
 a plurality of (N/2) second means for coupling respective ones of said (N/2) first means to adjacent pairs of cylinders of said engine such that an $i^{th}$ of said (N/2) first means is exclusively coupled to a $2i^{th}$ and a $2i^{th}-1$ one of said cylinders, where $1=i=N/2$.

47. An arrangement according to claim 46, further including a plurality of (N/2) transducers respectively affixed to said plurality of (N/2) first means from which a plurality of (N/2) output signal waveforms may be obtained.

* * * * *